United States Patent Office 2,815,300
Patented Dec. 3, 1957

2,815,300

METHOD OF COATING A FABRIC WITH AN ALKOXY END BLOCKED POLYSILOXANE

Frederick A. Smith, Kenmore, N. Y., assignor to Union Carbide Corporation, a corporation of New York No Drawing. Application April 15, 1955,
Serial No. 501,725

9 Claims. (Cl. 117—103)

This invention relates to the use of high molecular weight alkoxy end-blocked polysiloxanes as coating compositions. More particularly, it concerns the preparation of such materials and their application to cloth compositions for the purpose of producing flexible, impregnated tapes and the like useful in their application to electrical insulation, gaskets, tubing, etc.

Flexible cloth tapes coated with organopolysiloxane gums or elastomers are of course well known. In general, such tapes are prepared by milling a suitable filler and catalyst into a high molecular weight polysiloxane, dissolving the mixture in a solvent, applying the solution to the cloth, and curing the coated cloth at advanced temperatures.

Conventionally, both hard gums and liquid oils have been used in this process and while each of these classes of impregnating agents has advantageous features, it is known that each leaves something to be desired. Thus, while hard polysiloxane gums having a high molecular weight generally exhibit excellent cured properties, they are difficult to process. Various problems in handling these materials reside, for example, in their remilling, in the fact that such gums dissolve in solvents slowly, and in that the solvent solution of the gum-filler-catalyst mixture is extremely thixotropic. This latter property results in poor penetration into the cloth and gives rise to an uneven coating which lacks the proper adhesive properties.

On the other hand, relatively low molecular weight liquid or semi-liquid dimethyl polysiloxane polymers process very readily when treated in the above-described manner. Such compounds dissolve in solvents easily, are not thixotropic, and adhere to cloth very well with good penetration and leveling. However, the cured elastomers of this type have low tensile strength, are soft, and have poor abrasion resistance. Accordingly, the poor cured properties of these compounds have militated against their success as cloth impregnators.

Alkoxy end-blocked organopolysiloxanes of low molecular weight have possibly been prepared heretofore by hydrolysis of alkoxysilanes followed by condensation of the hydrolysis product, as disclosed, for example, in United States Patent No. 2,494,920 or 2,415,389. Although it is possible for compounds prepared in accordance with the methods of these patents to contain some alkoxy end-blocked polysiloxanes, the methods disclosed therein give rise to complex mixtures of products of relatively low molecular weight and such methods are impossible to control with respect to the alkoxy end-blockers. This same problem is discussed in the copending application of D. L. Bailey, Serial No. 398,225, filed December 14, 1953, relating to alkoxy end-blocked polysiloxanes of the type herein described. It is difficult, if not impossible, in applying the processes taught in these patents to form alkoxy end-blocked polysiloxanes having viscosities in the range required for purposes of the present invention.

It is, therefore, a general object of the present invention to overcome the above-described difficulties inherent in the manufacture of flexible polysiloxane impregnated tapes by obtaining and utilizing a material which provides ease of handling and yet which, upon being cured, sets up in a stable tack-free form having the tensile strength and hardness required in a cloth coating.

Another object is to provide a silicone coating for impregnation of cloths which has the handling properties of more fluid silicones and the cured properties of solid gumlike silicones.

Still another object of the invention is to obtain and utilize as a cloth coating relatively low molecular weight silicones carrying alkoxy end-blockers and having the easy compounding characteristics and excellent coating properties discussed above, which silicones are adaptable to further polymerize through the alkoxy end-blockers upon being cured so that high molecular weight gums are formed having the desirable cured properties of the above-mentioned high molecular weight compounds.

A further object is to provide a coated cloth composition which is tough, resilient, and flexible, and which has good solvent and moisture resistance, high thermal stability and excellent dielectric properties.

These and additional objects and advantages of the present invention will be apparent from the following detailed description.

Briefly described, the above objects are accomplished in accordance with the present invention by impregnating fabrics with a relatively low molecular weight soluble liquid polysiloxane which contains end-blockers of the alkoxy type rather than the usual completely stable end-blockers derived from trimethylchlorosilane or the like. Such alkoxy groups are employed as non-permanent end-blockers serving to temporarily control the molecular weight before cure, as will hereinafter be more fully described.

The silicones which may be employed as starting materials in accordance herewith are of the general type disclosed in the copending application referred to above. Such alkoxy end-blocked starting materials are prepared in accordance with the preferred embodiment thereof by equilibrating a relatively large amount of a cyclic polysiloxane, for example $[(CH_3)_2SiO]_4$, with a small amount of an alkoxy silane under substantially anhydrous conditions in the presence of an alkaline catalyst at 150° C. Thus, a polysiloxane free from alkoxy groups is heated with an alkoxy silane having at least one hydrocarbon radical attached to the silicon atom in the presence of an alkaline catalyst. Alternatively, it has been found that the end-blockers may be provided by employing in the equilibration reaction a suitable alkoxy substituted polysiloxane rather than an alkoxy silane. As disclosed in the present invention, by suitable adjustment of the charging ratio of the reactants the product formed is an alkoxy end-blocked silicone polymer having a viscosity ranging from 200,000 centipoises to a gum of miniature penetration of 35. The miniature penetration figures given are those measured using a standard penetrometer and represent a gauge for determining the consistency of the material. The numbers reported indicate the distance in 0.1 mm. that a standard needle passes vertically into the material under a 20 gm. needle loading in 10 seconds at 25° C. This penetrometer test is described by Kaufman, Finn, and Harrington in Industrial and Engineering Chemistry, analytical edition, volume 11, pages 108–110 (1939). While the invention contemplates the provision of alkoxy end-blocked silicone polymers of relatively high molecular weight and viscosity, it is important that the gums employed not be so hard that they are no longer easily dissolved in solvents. Thus the preferred range of viscosity is from about 300,000 to 700,000 centipoises.

The alkoxy end-blocked silicones thus formed generally contain from about 0.05 to about 0.15 alkoxy groups per 100 silicon atoms. The preferred range is from about 0.06 to about 0.11 alkoxy groups per 100 silicon atoms, which corresponds to about 0.02% to about 0.09% by weight alkoxy group in the polymer. It has been found that the alkoxy end-blocker may be mono-, di-, or tri-functional, i. e., mono-, di-, or tri-alkoxy. Thus, the end-blocker may be any one of the following groups:

$$[R_2Si(OR')]_2O$$
$$RSi(OR')_3$$
$$[RSi(OR')_2]_2O$$
$$R_2Si(OR')_2$$
$$R_3SiOR'$$

In these formulae, R is an organic radical containing from one to about six carbon atoms and preferably from one to about three, and R' is an organic radical having from 1 to 12 carbon atoms, both R and R' being alkyl, aryl, alkyl-aryl, or aralkyl groups. It is preferred to employ combinations wherein R is a methyl group and the R' group contains from 2 to 6 carbon atoms. In polymers prepared with the preferred end-blocker, the methyl group to silicon atom ratio is in the range of from about 1.98 to about 2.00, which is in the conventional range for silicone elastomers.

Examples of the preparation of alkoxy end-blocked silicones formed with the end-blocker ratio adjusted to give gums ranging from very soft to very hard are set forth below. A series of experiments were run employing methoxy, ethoxy and allyloxy end-blockers. A typical experiment in which an ethoxy end-blocker was employed is as follows:

To a clean 1-gallon bucket was charged 3015 g. of $(Me_2SiO)_4$ technical grade [85% $(Me_2SiO)_4$; 15% $(Me_2SiO)_{3\ and\ 5}$]. An end-blocker additive in varying amounts as shown in the following table and having the formula $[(CH_3)_2Si(OCH_2-CH_3)]_2O$ was mixed with the tetramer. The contents were heated to 145° C. At this point, sufficient potassium dimethylsilanolate catalyst containing 3.25 wt.–% K was added in 50 g. of the tetramer to give an over-all content of 30 p. p. m. catalyst. The mixture was then agitated to obtain a uniform dispersion of catalyst. The lid was securely fastened to the bucket and it was placed in a 150° C. constant temperature oven for 3½ hrs. The bucket was then removed and cooled to room temperature. The resultant silicone compounds showed the following physical properties for the varying amounts of end-blocker used:

| End-blocker Added | Wgt. Percent | Miniature Penetration of Resulting Gum |
|---|---|---|
| None | 0 | 39 (Very Hard). |
| (EtO)Me₂SiOSiMe₂(OEt) | 0.02 | 63 (Hard). |
| (EtO)Me₂SiOSiMe₂(OEt) | 0.05 | 104 (Moderately Hard). |
| (EtO)Me₂SiOSiMe₂(OEt) | 0.10 | 224 (Soft). |
| (EtO)Me₂SiOSiMe₂(OEt) | 0.15 | 383 (Very Soft). |

The process of coating the alkoxy end-blocked silicone on cloth is as follows: First, suitable filler material and catalyst are milled into the alkoxy end-blocked compound. It is preferred to use heat resistant inorganic materials melting above 350° C. for fillers. Two such fillers are usually employed, one as a reinforcing agent and the other for bulking purposes. The reinforcing filler is of the conventional silica type, being marketed commercially under such names as Santocel CS (manufactured by Monsanto Chem. Co.), Aerosil, Hi Sil XR 303, and Davison "Low Density Silica." Among the bulking fillers which may be employed are diatomaceous earth, calcium carbonate, iron oxide, titanium dioxide, clay such as "Whitetex." Such fillers have been used individually and in various combinations in the practice of the present invention. It is preferred to employ between 30 and 100 parts total of filler per 100 parts of silicone polymer. The range producing optimum results is 5 to 25 parts of reinforcing filler plus 100 to 5 parts of bulking filler per 100 parts silicone polymer.

The catalysts or more properly the free radical initiators employed in promoting the reaction are the conventional ones. Thus, any diacyl peroxide containing at least one aromatic acyl radical as well as other suitable peroxy type materials are satisfactory. Dibenzoyl peroxide and t-butyl perbenzoate are found to be especially effective. The loadings used are from 1.5 to 5.5 parts catalyst per 100 parts silicone polymer, with 5 parts catalyst being the preferred amount. No invention is predicated on the selection of the particular peroxide catalyst per se and further discussion is therefore unnecessary for one skilled in the art to select a proper material.

The next step in the coating process consists of dissolving the filler-catalyst-silicone mass in a solvent, such as toluene, to produce a dilute solution comprising from about 20% to about 50% by weight of the mass. The resulting paste-like solution is then applied to the cloth, as with a spreading knife or the like, in order to form a coating of even thickness thereon. Alternatively, the polysiloxane-filler mixture may be diluted and applied by dipping the cloth therein.

The coated fabric is freed of solvent by heating in air at 25° to 75° C. and is then cured at 125° to 150° C. for a period of at least about 10 minutes and preferably from about 15 to about 25 minutes. During this curing the alkoxy end-block silicone polymerizes to a limited extent under the influence of the catalyst to form an elastomeric material.

The final step in the preparation involves subjecting the coated cloth to a post-cure for at least about 10 minutes and preferably about 24 hours or more at a temperature between 150° C. and 250° C., and preferably at least about 175° C. During the first cure, all of the catalyst is decomposed and the non-permanent alkoxy end-blockers then polymerize in the second or post-cure under the influence of heat to form a high molecular weight fully cured elastomer having very desirable physical properties. Attention is drawn to the fact that whereas the 125°–150° C. cure promotes polymerization in the presence of the catalyst, the alkoxy groups are substantially unaffected, and the 175°–250° C. post-cure promotes polymerization of the temporary alkoxy end-blockers under the influence of heat rather than catalyst. Although the various heating and holding steps are preferably accomplished, in industrial practice, in a continuous process type of apparatus, such as a tower having various temperature zones, still it is important to note that the solvent exclusion and the two cures are separate steps in the process, attaining separate results. It has been found by experimentation that if the solvent removal step is eliminated and the solvent containing coating placed directly in a 125°–150° C. oven, excessively rapid evaporation of solvent results in blistering of the coating which is, of course, extremely undesirable as well as otherwise resulting in a deficient product.

In order to illustrate the stabilizing effect of the post-cure on the coating, the following experimental results are presented. The values in the table below were determined using strips of silicone compound cured separately from the cloth, since these properties cannot be conveniently measured where the elastomer has been deposited on the cloth:

| | Cure 15–20 minutes at 125–150° C. | Post Cure 24 Hours at— | | | |
|---|---|---|---|---|---|
| | | 150° C. | 175° C. | 200° C. | 250° C. |
| Tensile strength, p. s. i. | 455 | 556 | 530 | 571 | 570 |
| Elongation, Percent | 150 | 117 | 117 | 130 | 100 |
| Shore Hardness | 52 | 56 | 58 | 59 | 63 |

It is noted that while the hardness and allied properties become progressively improved as the temperature is increased above 150° C., the optimum results are obtained when the post-curing oven is maintained between 200° and 250° C.

Having thus described the general conditions of the polymerization reaction and the various steps employed in coating the cloth, there is set forth below, by way of illustration and not of limitation, certain specific examples of the manner in which the alkoxy end-blocked silicone materials may be coated on cloth. Preceding the examples, in Table 1, there are set forth comparative results obtained using the alkoxy end-blocked polymers, which are the subject of the present invention, and currently available commercial preparations A, B, and C, which are marketed for the same purpose.

TABLE 1

| Property | Alkoxy End-Blocked | A (Methyl End-Blocked) | B | C |
|---|---|---|---|---|
| Ease of milling and compounding | Excellent | Excellent | Excellent | Excellent. |
| Ease of remilling | ...do | ...do | Good | Good. |
| Ease of dissolving | ...do | ...do | Poor | Poor. |
| Coating characteristics | ...do | ...do | Fair | Fair. |
| Viscosity, 33% in toluene (cps.) | 2,000 | 2,000 | 9,000 | 9,000. |
| Thixotropy | Slight | Slight | Great | Great. |
| Flow-out on cloth | Excellent | Excellent | Fair | Fair. |
| Cure 5 p. p. h. benzoyl peroxide | Good | ...do | Excellent | Excellent. |
| Dielectric strength, v./mil | 1,200 | 1,200 | 1,200 | 1,100. |
| Dielectric strength after aging 96 hr. at 96% relative humidity v./mil. | 1,200 | 1,200 | 1,200 | 1,000. |
| H$_2$O absorption after 100 hrs. immersion | 2% | 2% | 2% | 1.8%. |
| Penetration into cloth | Excellent | Excellent | Good | Fair. |
| Adhesion to cloth | ...do | ...do | Good | Good. |
| Crank test (no. of 360° flexes to failure) | Over 20 | Over 20 | Over 20 | Over 20. |
| | Properties of Molded Elastomer Only, without Cloth | | | |
| Tensile strength, p. s. i | 300 | 300 | 400 | 350. |
| Percent Elongation at break | 250 | 200 | 225 | 250. |
| Hardness, Shore Durometer | 35 | 42 | 45 | 34. |
| After aging 24 hrs 250° C.: | | | | |
| Tensile strength, p. s. i | 550 | 400 | 375 | 300. |
| Elongation percent at break | 150 | 150 | 150 | 250. |
| Hardness, Shore Durometer | 53 | 48 | 48 | 34. |

Attention is drawn to the high tensile strength attained upon post-curing by the elastomers employed in practicing the invention as contrasted with the strength exhibited by conventional silicones used for like purposes. It is the extraordinary strength and hardness of the elastomers obtained in accordance with the invention that result in their particularly advantageous utility as cloth coating compositions.

*Example 1*

A compound was prepared on a differential roll mill according to the following formulation:

| | Parts |
|---|---|
| Ethoxy end-blocked silicone gum, 500,000 cps | 100 |
| Santocel CS (silica) | 10 |
| Superfloss (diatomaceous earth) | 35 |
| Titanox RA (titanium dioxide) | 2 |
| Benzoyl peroxide | 5 |

The compound milled rapidly to a soft, plastic non-sticky material. After aging at room temperature for 65 hours to permit "wetting" of the filler it easily and rapidly replasticized on the same roll mill. A 35% solution was prepared by agitating with toluene for 2 hours. The viscosity of this solution was 2000 centipoises as measured in a Brookfield viscosimeter using No. 4 spindle oil at 60, 30, 12 and 6 R. P. M., indicating little or no thixotropy. A heat desized glass cloth was coated from this solution which comprised 28% solids and had a viscosity of 800 centipoises. The cloth was dipped and then drained for 10 minutes and finally desolvated for 10 minutes at 75° C. Following the removal of solvent it was cured at 150° C. for 15 minutes. Two coats were applied to give a final tape 10 mils thick. The post-cured coating after 20 minutes at 250° C. was tough, glossy, adherent, and flexible and showed excellent penetration into the glass cloth. The dielectric strength was 1250 volts per mil and the water absorption after 100 hours immersion was less than 2%. After 3 weeks at 250° C. the coated cloth was still flexible, tough, and had a dielectric strength of 1250 volts per mil.

*Example 2*

The following formulation was compounded on a 2-roll mill:

| | Parts |
|---|---|
| Ethoxy end-blocked gum | 100 |
| Santocel CS (silica) | 10 |
| Superfloss (diatomaceous earth) | 35 |
| Titanox RA–50 (titanium dioxide) | 2 |
| Benzoyl peroxide | 5 |

The compound was "rested" (i. e. allowed to stand) 65 hours at room temperature, remilled and dissolved in toluene to prepare a 28% solution of 650 centipoises viscosity. Solution was rapid, only 10 minutes being required to prepare the solution by adding toluene to the compound while it was milling on the roll mill. One-inch wide glass tape was continuously coated in a laboratory size glass tape coating machine. A 2½ mil layer was coated on both sides of 3 mil thick glass tape at a rate of ½ to 1 foot per minute. The solvent was removed in 10 minutes below 80° C. and then cured in 10 minutes at 150° C. in heated sections of a 10 ft. tower. The coating was smooth, level, glossy, even, and fairly well cured. The post curing was then accomplished by placing the roll of coated tape in an oven at 250° C. for several hours. The coating became completely cured under these conditions. The properties are shown below:

| | |
|---|---|
| Dielectric strength, as made | 1115 volts per mil. |
| Dielectric strength, 96 hrs., 96% RH | 1000 volts per mil. |
| Penetration | Good. |
| Adhesion to glass | Good. |
| Toughness | Good. |
| Moisture absorption, 100 hrs. immersion | 4%. |
| After aging 200 hrs., 250° C., ⅛" bend | 1250 volts per mil dielectric strength. |
| Tensile strength of coated tape | 100 lbs. per inch width. |

Example 3

A compound was prepared having the following formulation:

| | Parts |
|---|---|
| Ethoxy end-blocked gum | 100 |
| Santocel CS (silica) | 30 |
| Titanox RA–50 (titanium dioxide) | 3 |

After resting and remilling, a 50% paste in toluene was applied to glass cloth with a spreading knife or doctor blade. The material wet the cloth well, spread easily, and cured to give a glossy, tough, flexible coating with excellent thermal stability. The material was commercially applied to glass sleeving by dipping and wiping through a circular die. Three coats were used to build up a layer of cured compound 14 mils thick, while curing at a temperature below about 150° C. between each coat. The sleeving, after coating and preliminary cures, was then heated over 480 hours at 450° C. and bent around a ¾ inch diameter mandrel. There was no evidence of failure of the coating. Competitive compounds failed after 96 hours.

Example 4

A compound was made according to the following formula:

| | Parts |
|---|---|
| Allyloxy end-blocked gum | 100 |
| Aerosil (silica) | 10 |
| Superfloss (diatomaceous earth) | 35 |
| Titanox RA (titanium dioxide) | 2 |
| Benzoyl peroxide | 5 |

Molded test slabs showed the tensile strength to increase from 400 p. s. i. to 600 p. s. i. on post-curing 20 hours at 250° C. A glass cloth was coated from a 30% solution of 3000 cps. viscosity by dipping and wiping between glass rollers to apply a coating nearly 1 mil thick of cured silicone rubber per pass. Five coatings were applied to 3 mil cloth with a 150° C. cure after each coating, to give a 7 mil tape. The coatings were smooth, glossy, completely bonded to each other and well bonded to the glass cloth, and very similar to tapes coated with ethoxy end-blocked or 2-methoxyethoxy end-blocked dimethyl polysiloxane gum stocks. A dielectric strength of 1,328 volts per mil was obtained.

From the foregoing it can be readily observed that the controlled polymerization of alkoxy end-blocked polymers produces relatively low molecular weight materials which can be formulated into coating compounds which are easily remilled and dissolved to form solutions having excellent coating properties and good penetration and flow. Although coating compounds similar to those obtained may be formulated by initially using high molecular weight polymers, the latter are difficult to dissolve and show inferior cured properties. By initially employing low molecular weight polymers as set forth in the present invention, a post-cure at 150° C. to 250° C. is required after application to a fabric to convert the cured alkoxy end-blocked compound to elastomers similar to those obtained from the higher molecular weight materials which are not end-blocked. During this post-cure, the tensile strength and hardness are so improved as to impart to the coating extremely desirable physical properties. End-blocking with alkyl or aryl silanes does not show this increase in physical properties after post-curing.

Having thus described my invention what I claim as novel and desire to protect by Letters Patent is as follows:

I claim as my invention:

1. The method of imparting a silicone composition to a fabric which method comprises applying to said fabric in a solvent carrier a formulation comprising an alkoxy end-blocked polysiloxane wherein the alkoxy end-blocker is a compound having a general formula selected from the group consisting of $[R_2Si(OR')]_2O$, $[RSi(OR')_2]_2O$, $RSi(OR')_3$, $R_2Si(OR')_2$, and $R_3SiOR'$ in which R is a hydrocarbon radical containing from one to about six carbon atoms and R' is a hydrocarbon radical having from 1 to about 12 carbon atoms, each of R and R' being a hydrocarbon radical selected from the group consisting of alkyl, aryl, alkylaryl, and aralkyl radicals, and which end-blocked polysiloxane has from about 0.05 to about 0.15 alkoxy groups per 100 silicon atoms and in its undiluted state has a viscosity at 25° C. of from about 200,000 centipoises to about 700,000 centipoises, filler material of the free radical initiator type, and an effective amount of a material capable of initiating cross linking in said polysiloxane at temperatures below about 150° C., subjecting the fabric containing said formulation, to a temperature not greater than about 75° C. to remove the solvent, subjecting the fabric to a temperature not greater than 150° C. for a period of from about 10 to about 25 minutes, and then subjecting the same to a temperature of at least about 150° C. for an additional period of time.

2. The method of preparing a silicone elastomer impregnated fabric which method comprises applying to said fabric in a solvent carrier a formulation comprising an alkoxy end-blocked polysiloxane wherein the alkoxy end-blocker is a compound having a general formula selected from the group consisting of $[R_2Si(OR')]_2O$, $[RSi(OR')_2]_2O$, $RSi(OR')_3$, $R_2Si(OR')_2$, and $R_2SiOR'$ in which R is a hydrocarbon radical containing from one to about six carbon atoms and R' is a hydrocarbon radical having from 1 to about 12 carbon atoms, each of R and R' being a hydrocarbon radical selected from the group consisting of alkyl, aryl, alkylaryl, and aralkyl radicals, and which end-blocked polysiloxane has from about 0.05 to about 0.15 alkoxy groups per 100 silicon atoms and a viscosity at 25° C. in its undiluted state of from about 200,000 centipoises to about 700,000 centipoises, filler material of the free radical initiator type, and an effective amount of a material capable of initiating cross linking in said polysiloxane at temperatures up to about 150° C., subjecting the fabric containing said formulation to a temperature of about 75° C. to remove the solvent, subjecting the fabric to a temperature of about 150° C. for a period of at least about 10 minutes, and then subjecting the same to higher temperature for an additional period of time.

3. The method of claim 2 wherein the fabric consists essentially of glass fibers.

4. The method of preparing a silicone elastomer impregnated fabric which method comprises admixing an alkoxy end-blocked polysiloxane wherein the alkoxy end-blocker is a compound having a general formula selected from the group consisting of $[R_2Si(OR')]_2O$, $[RSi(OR')_2]_2O$, $RSi(OR')_3$, $R_2Si(OR')_2$, and $R_3SiOR'$ in which R is a hydrocarbon radical containing from one to about three carbon atoms and R' is a hydrocarbon radical having from 1 to about 12 carbon atoms, each of R and R' being a hydrocarbon radical selected from the group consisting of alkyl, aryl, alkylaryl, and aralkyl radicals, and which end-blocked polysiloxane has from about 0.05 to about 0.15 alkoxy groups per 100 silicon atoms and in its undiluted state has a viscosity at 25° C. of from about 200,000 centipoises to about 700,000 centipoises, filler material, and from 1.5 to 5.5 parts per 100 parts polysiloxane of a material selected from the group consisting of benzoyl peroxide, t-butyl perbenzoate and dichlorobenzoyl peroxide and capable of initiating cross linking in said polysiloxane at temperatures below about 150° C., milling the resulting admixture, permitting the milled admixture to stand for a period of at least about 12 hours, milling the admixture a second time, diluting said admixture with an organic solvent to produce a dilute solution comprising from about 20% to about 50% by weight of said admixture, applying said dilute solution to a fabric, subjecting the solution-treated fabric to a temperature not greater than about 75° C. to remove the solvent, subjecting the fabric to a temperature not greater than about 150° C. for a period of at least about 10 minutes, and subjecting the treated fabric thereafter to a temperature above 150° C. for at least about 1 hour.

5. The method of coating a cloth composition, which method comprises forming an alkoxy end-blocked silicone polymer wherein the alkoxy end-blocker is a compound having a general formula selected from the group consisting of $[R_2Si(OR')]_2O$, $[RSi(OR')_2]_2O$, $RSi(OR')_3$, $R_2Si(OR')_2$, and $R_3SiOR'$ in which R is a hydrocarbon radical containing from one to about six carbon atoms and R' is a hydrocarbon radical having from 1 to about 12 carbon atoms, each of R and R' being a hydrocarbon radical selected from the group consisting of alkyl, aryl, alkylaryl, and aralkyl radicals, and which end-blocked polysiloxane has from about 0.05 to about 0.15 alkoxy groups per 100 silicon atoms and a viscosity ranging from 200,000 centipoises to a gum of miniature penetration of 35 by equilibrating a siloxane polymer having no alkoxy groups with an alkoxy siloxane under substantially anhydrous conditions in the presence of an alkaline catalyst, milling a suitable filler and a second catalyst containing at least one peroxide group into said alkoxy end-blocked polymer, dissolving the resulting mixture in a solvent, applying the solution to a cloth so as to form a coating thereon, desolvating the coated cloth at a temperature of about 75° C., subjecting the cloth to a cure at a temperature not greater than about 150° C. for a period of at least about 10 minutes and subjecting the coated cloth to a post-cure for at least about 1 hour at a temperature above 150° C.

6. The method of claim 4 wherein the alkoxy end-blockers in said alkoxy end-blocked polysiloxane are ethoxy end-blockers.

7. A fibrous textile material impregnated with an alkoxy end-blocked polysiloxane wherein the alkoxy end-blocker is a compound having a general formula selected from the group consisting of $[R_2Si(OR')]_2O$, $[RSi(OR')_2]_2O$, $RSi(OR')_3$, $R_2Si(OR')_2$, and $R_3SiOR'$ in which R is a hydrocarbon radical containing from one to about six carbon atoms and R' is a hydrocarbon radical having from 1 to about 12 carbon atoms, each of R and R' being a hydrocarbon radical selected from the group consisting of alkyl, aryl, alkylaryl, and aralkyl radicals and which end-blocked polysiloxane has from about 0.05 to about 0.15 alkoxy groups per 100 silicon atoms, said polysiloxane having a viscosity at 25° C. of from about 200,000 centipoises to about 700,000 centipoises.

8. An alkoxy end-blocked polysiloxane wherein the alkoxy end-blocker is a compound having a general formula selected from the group consisting of $[R_2Si(OR')]_2O$, $[RSi(OR')_2]_2O$, $RSi(OR')_3$, $R_2Si(OR')_2$, and $R_3SiOR'$ in which R is a hydrocarbon radical containing from one to about six carbon atoms and R' is a hydrocarbon radical having from 1 to about 12 carbon atoms, each of R and R' being a hydrocarbon radical selected from the group consisting of alkyl, aryl, alkylaryl, and aralkyl radicals, and which end-blocked polysiloxane has from about 0.05 to about 0.15 alkoxy groups per 100 silicon atoms, said polysiloxane having a viscosity at 25° C. of from about 200,000 centipoises to about 700,000 centipoises.

9. The polysiloxane of claim 8 wherein R' of the end-blockers is an ethyl radical.

References Cited in the file of this patent

UNITED STATES PATENTS

| | | |
|---|---|---|
| 2,415,389 | Hunter | Feb. 4, 1947 |
| 2,438,736 | Barry | Mar. 30, 1948 |
| 2,574,265 | Hyde | Nov. 6, 1951 |
| 2,626,273 | Hunter | Jan. 20, 1953 |